United States Patent [19]

Pillard

[11] 4,344,772
[45] Aug. 17, 1982

[54] GAS GENERATOR WITH FIXED BED AND REVERSE DRAUGHT, TO GASIFY SOLID COMBUSTIBLE MATERIALS

[75] Inventor: Jean-Claude Pillard, Marseilles, France

[73] Assignee: Entreprise Generale de Chauffage Industriel Pillard, Marseilles, France

[21] Appl. No.: 207,632

[22] Filed: Nov. 17, 1980

[30] Foreign Application Priority Data

Nov. 16, 1979 [FR] France .................... 79 28661

[51] Int. Cl.³ .......................................... C10J 3/68
[52] U.S. Cl. ........................................ 48/76; 48/77; 48/66
[58] Field of Search ............... 48/76, 77, 64, 66, 67, 48/68, 69, 86 R, 89, 101, 111; 110/254

[56] References Cited

U.S. PATENT DOCUMENTS 399,796  3/1889  Taylor ........................... 48/66
486,491 11/1892  Murray ......................... 48/64

Primary Examiner—Richard V. Fisher
Attorney, Agent, or Firm—Bucknam and Archer

[57] ABSTRACT

The invention relates to a gas generator with fixed bed and reverse draught, to gasify solid combustible materials.

The gas generator according to the invention comprises starting from the top downwards, a loading compartment, a drying and pyrolysis enclosure, a combustion chamber, a rotary hearth plate and an ash tray. The wall of the combustion chamber is lined with a coil inside which flows part of the combustion air which is injected obliquely on the top periphery of the chamber. The center of the combustion chamber is occupied by a core which is driven in rotation by the hearth plate and which is covered by a deflector. Another part of the combustion air is injected through the core at the top of the combustion chamber.

The invention finds an application in the gasification of all types of combustible solid material, which may or may not be associated to their carbonization.

11 Claims, 3 Drawing Figures

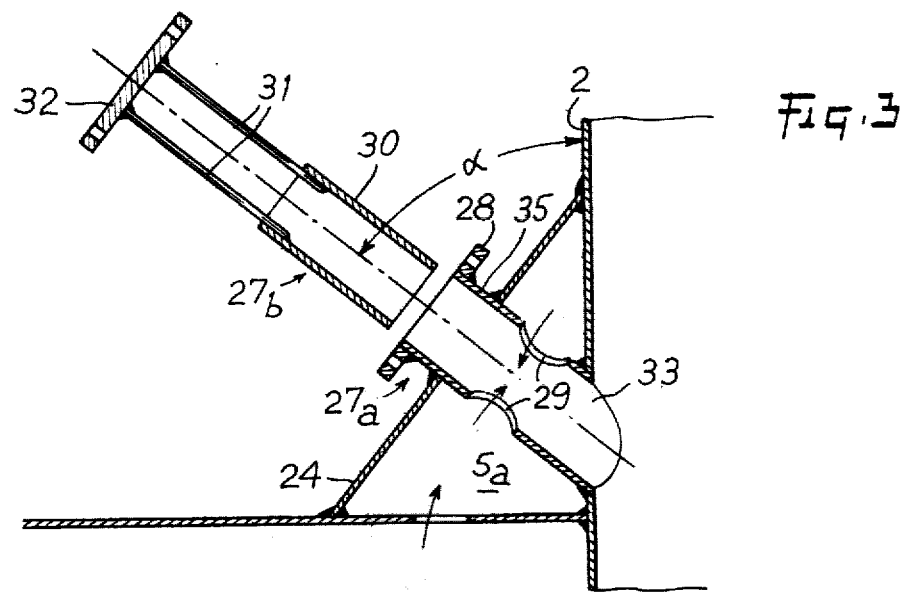
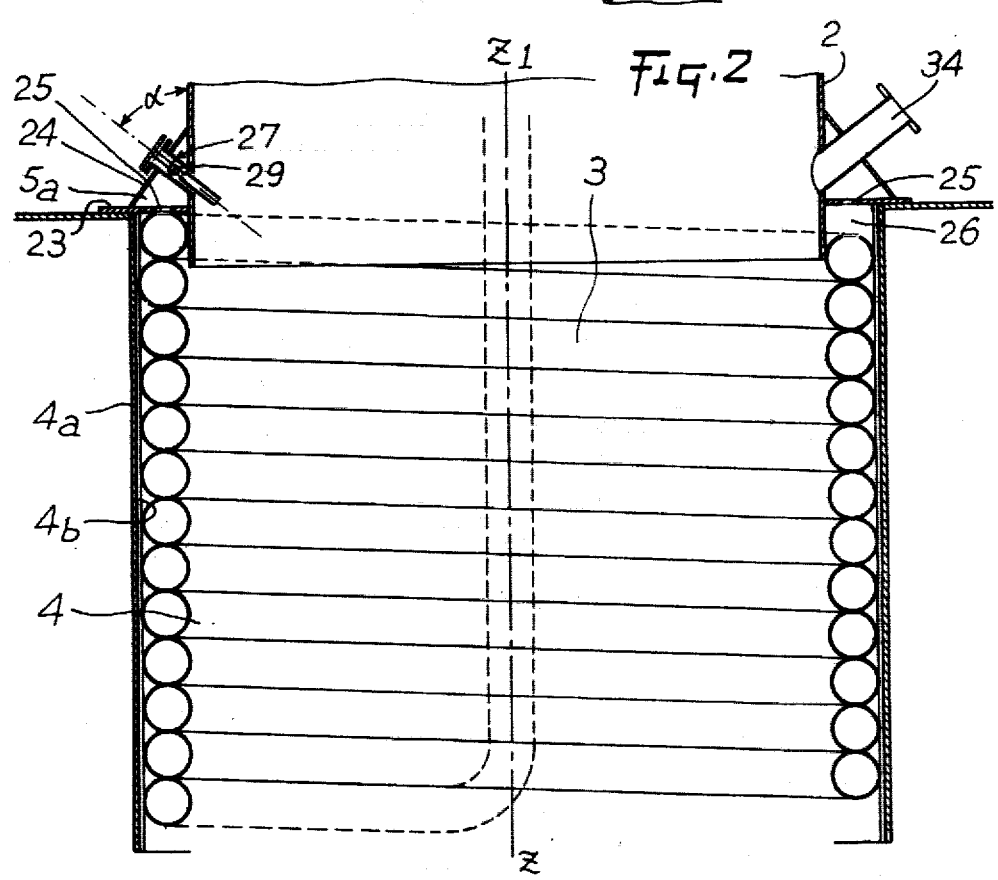

GAS GENERATOR WITH FIXED BED AND REVERSE DRAUGHT, TO GASIFY SOLID COMBUSTIBLE MATERIALS

The present invention relates to gas generators, with fixed bed and reverse draught, to gasify solid combustible materials.

The technical field of the invention is that of the constructions of an apparatus for the distillation of solid fuel, known as gas generators or gasogenes designed to decompose the combustible materials by pyrolysis and controlled oxidation in order to extract therefrom the combustible gases (CO, $H_2$ or hydrocarbons).

The apparatus according to the invention can be used at the same time as carbonizers of wood or other vegetable wastes with a view to producing not only gases but also charcoal, which is extracted at the base of the apparatus.

The gas generating apparatus according to the invention is designed to gasify all sorts of solid combustible materials in divided form, having a granulometry such that the combustible material bed is permeable to gases, and in particular wood, coal and other carbon minerals, charcoal and all vegetable wastes, such as for example walnut or coffee husks, seeds or cereal husks, etc . . . , this list not being in any way restrictive.

The gas generating apparatus according to the invention is a vertical generator of the known type with fixed bed and reverse draught, which comprises a burning layer or bed of constant thickness through which the gases flow downwards from the top.

The object of the present invention is to propose an improved gas generator which overcomes the difficulties existing with this type of apparatus. One of these difficulties is to obtain a regular descent of the solid combustible materials and in particular to avoid the formation of preferential advances of the gases through the bed which could cause strong differences of temperature. Another difficulty is to inject the combustion air in homogeneous manner into the bed so that the high temperature zone is homogeneous. Yet another difficulty with the apparatus used to gasify vegetable products or mineral coal is to allow the tars released during the preheating of the combustible material and during the pyrolysis phase, to go through the high temperature zone of combustion in order to be cracked and converted into more adequate gaseous products.

These different objects are contradictory and have given rise to the development of installations which have favored one to the detriment of the others.

Gas generators have been constructed which contain cooled nozzles penetrating the bed of burning material, and injecting the combustion air therein. Said nozzles improve the uniform distribution of the air, but they impair the gravity-induced flow of the materials.

Gas generators with rotary hearth plate and non-reverse draught have also been constructed, which have helped the flow of products but do not permit to obtain a good cracking of the pyrolysis tars.

Further objects of the present invention are to procure gas generators which fulfill certain requirements, such as:

the possibility of obtaining richer gases by preheating the combustion air, thereby permitting to reduce its flow;

the possibility of avoiding the risks arising when hot ashes come in contact with the walls, by adequately cooling those walls in contact with the hottest zone;

the possibility of avoiding the risks of inside clogging due to an adequate and adjustable elimination of the ashes; and the possibility of reducing the production and maintenance costs of the apparatus.

A gas generator for solid combustible materials, according to the invention, is of the fixed bed type with reverse draught, comprising a cylindrical drying and pyrolysis enclosure of vertical axis, which is equipped at its upper end with a loading compartment, the lower end being opened and communicating with a co-axial combustion chamber.

The objects of the invention are attained due to a gas generator wherein the wall of the combustion chamber is composed of a shell-plate which is lined on the inside with one or more coils of which the lower ends are connected on one or more air-inlets whilst the upper ends are connected to an annular collector situated on the junction between the said enclosure and the said combustion chamber and which comprises air outlets inclined downwardly and towards the axis.

The lower end of the combustion chamber comprises a rotary hearth plate provided on its lower face with small stiffening blades pushing the ashes towards the ash grid placed above the ash tray.

The rotary hearth plate is mounted on a hollow shaft which traverses it right through and the lower end of which is connected to a combustion air inlet.

The upper face of the rotary hearth plate is provided with an axial rotary core forming a vertical chimney which extends over the whole height of the combustion chamber, co-axially thereto, the said chimney communicating via its lower end with the upper end of the said hollow shaft and being covered at its upper end by a truncated cone-shaped deflector which deviates the combustion air and injects it downwards and obliquely in the top of the combustion chamber.

According to a preferred embodiment, said chimney is composed of two coaxial tubes defining together a first annular space inside which flows the combustion air.

The inside tube of the axial chimney is provided with bars in refractory metal which extend through the said first annular space where they are cooled by the combustion air and which traverse the external tube to penetrate the combustion bed so as to improve the descent of the materials.

A gas generator according to the invention comprises a first cylindrical casing which surrounds co-axially the combustion chamber and the lower part of the said drying and pyrolysis enclosure defining therewith a second annular space having a lower end which communicates with a peripheral opening in the lower end of the combustion chamber, the annular space comprising, in its upper part, an outlet pipe for the combustible gases.

Preferably, a gas generator according to the invention comprises a second cylindrical outer casing which co-axially surrounds the first casing defining therewith a third annular space which is opened at the top and which is provided at the base with an outlet pipe connected, on the one hand, with the air inlets of the said coil and, on the other hand, with the lower end of the said hollow shaft and the third annular space forms part of a circuit for pre-heating the combustion air, which circuit can be equipped with a blower if necessary.

The result of the invention is a new gas generator for solid combustible materials, or gasogene, permitting the transformation of the solid combustible materials into combustible gases, by pyrolysis, cracking of the tars and controlled oxidation. Depending on the degree of oxidation, ashes are collected at the base of the apparatus if the combustion is total, or wood or vegetable charcoal, if the oxidation is controlled and is conducted at a lower temperature, and in the latter case, the apparatus operates as a charcoal furnace.

The advantages of the gas generators according to the invention are as follows.

The combustion air is injected homogeneously into the burning bed.

The wall of the high temperature combustion chamber is adequately cooled by the coils lining it and by the gases flowing over the other face. It shows no risk of contacting with the hot and corrosive ashes and expands easily and freely.

The combustion air is strongly pre-heated, this permitting it to obtain a high combustion temperature, even with solid combustible materials having a relatively low heating power, and to obtain richer combustible gases at the outlet of the apparatus.

The bed of solid material descends freely by gravity as there is no hammering or obstacle. The movement of gravity-induced descent is helped by the action of the rotary hearth plate and of the rotary core which supports de-clogging arms.

The elimination of the ashes by the rotary hearth plate is positive and efficient. Thermal losses are reduced.

The invention will be more readily understood on reading the following description with reference to the accompanying drawings, in which:

FIG. 2 is a partial vertical cross-section view showing another embodiment of the combustion chamber in the gas generator of FIG. 1.

FIG. 3 is an exploded cross-section view of a nozzle as shown in FIG. 2.

Figure 1:
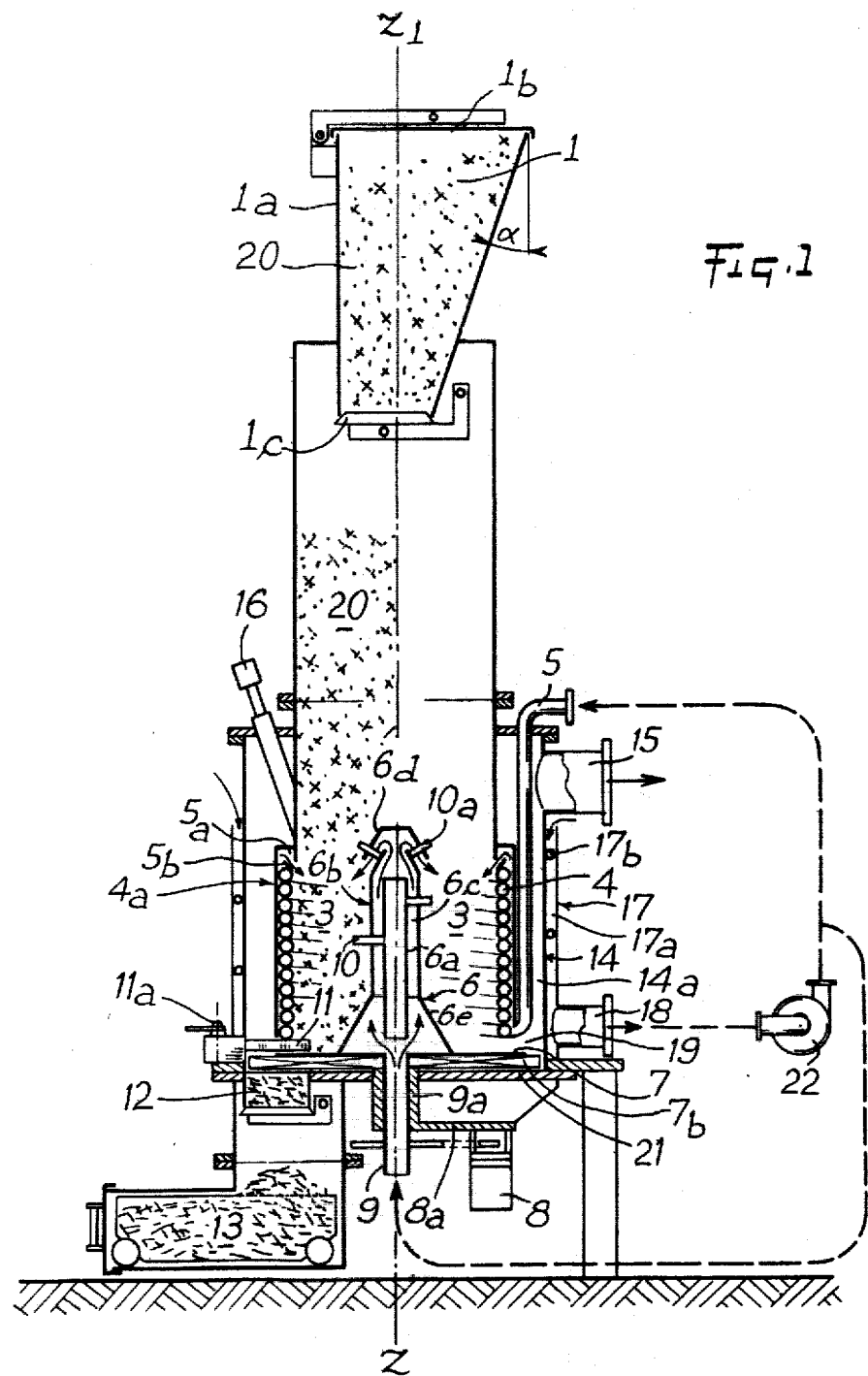
FIG. 1 is an axial vertical cross-section view of a gas generator according to the invention.

It is specified that a gas generator according to the invention can be used as a charcoal furnace, namely to obtain a controlled oxidation which transforms a solid combustible material into vegetable charcoal and into gas. It can also be used as a gasogen to convert completely a solid combustible material into gas and ashes. The structure of the apparatus remains the same in both cases. The functioning, on the contrary, differs by the reaction temperatures and by the rates of flow of the combustion air.

An apparatus according to the invention comprises at its upper end a tight loading compartment 1. Said compartment is preferably defined by a truncated cone-shaped casing 1a. Said truncated cone-shaped casing is a developable cone portion whose cross-sections are circles and whose generatrices converge on an apex situated downwards, and form, with the vertical, an angle varying between zero and a maximum angle $\alpha$ in order to help the gravity-induced flow of solid combustible materials 20, in the divided state, which are introduced into the loading compartment. The upper end of said compartment is closed by a loading cover 1b and the lower end is closed by an obturating plate 1c and of course both obturating means 1b and 1c are never opened simultaneously.

The loading compartment 1 is placed at the top of a cylindrical column-shaped enclosure 2 of vertical axis $z$ $z_1$. Said enclosure defines a volume inside which takes place from top to bottom first the drying, and then the decomposition by pyrolysis of the combustible materials 20 as they progress downwards by gravity. For clarity's sake, the drawings only show the combustible materials on the lefthand side of the figure.

The lower end of the enclosure 2 is open and communicates with the inside of a combustion chamber 3 which is situated under the said enclosure 2 and which is co-axial therewith. The dried and pyrolyzed materials flow by gravity into the chamber 3 where they are subjected either to a controlled combustion leading to wood charcoal or to any other vegetable charcoal, or to a total combustion. In all cases the combustion chamber 3 is a high temperature zone, inside which takes place the cracking of the tars resulting from the pyrolysis in the bottom part of the column 2.

The bottom end of the combustion chamber is equipped with a rotary hearth plate 7. A peripheral opening 19 separates the lower end of the chamber 3 from the said hearth plate and said opening 19 is used as an outlet for the gases and for the removal of the ashes or the coal.

The cylindrical side wall of the combustion chamber 3 is composed of a cylindrical or slightly truncated cone-shaped shell-plate 4a, of axis $z$ $z_1$, which is lined on the inside with one or more coils 4 composed of one or more bent tubes. The whorls of the coil or coils 4 may be jointed as shown in the drawing. They may also not be jointed in which case, it is possible to put, in the free space between the whorls, a concrete or any other refractory material.

The upper end of the coil or coils is connected to an annular collector 5a which is placed at the upper end of the combustion chamber, where the latter joins with the column 2. As clearly shown in FIG. 1, the shellplate 4a has preferably a diameter slightly greater than that of the column 2 and the coils 4 as well as the collector 5a are disposed in the extra width.

The lower end of the coil or coils 4 is connected to one or more pre-heated combustion air inlets, such as for example a pipe 5. Said pipe 5 is not limited to the position given to it in the drawing.

Part of the air needed for the combustion in the chamber 3 flows through the coil 4 where it warms up whilst protecting the side walls of the chamber. The collector 5a is provided with air outlets inclined downwardly and towards the axis, such as for example openings or an annular slot, and also with an annular cone-shaped deflector 5b, so that at the upper end of the combustion chamber there is a peripheral distribution of the combustion air which is projected on to the annular surface of the heap of combustible material flowing from the column 2. The FIG. 1 shows with arrows the direction taken by the combustion air distributed by the collector 5a. The rotary hearth plate 7 is constituted by a horizontal disc mounted on a hollow shaft 9 which traverses the said plate and pivots in a bearing 9a. Said shaft 9 is driven in rotation by a motor 8 and by a transmission 8a which can be for example a gear and chain transmission or any other equivalent transmission.

The lower end of the hollow shaft 9 is connected to a second combustion air inlet means so that the combustion air needed to supply the combustion chamber 3 is distributed between the inlets 5 and 9. The air distribution between the two circuits is determined experimentally.

The rotary hearth plate is provided on its lower face with radial stiffening ribs or vanes 7b running over the periphery of the hearth plate and driving positively the ashes falling from the hearth plate towards a receiving compartment 12 from which they are thereafter removed towards a rolling ash-tray 13. Said hearth plate cooperates with a stationary and adjustable raking member 11 situated above the hearth plate and against which come the ashes. Said raking means 11 can, as illustrated, be mounted to pivot about a vertical axis 11a which allows it to be placed in the abutting position or to be retracted.

The rotary hearth plate 7 supports on its upper face, a rotary axial core 6. Said core of axis $z\,z_1$ extends substantially over the whole height of the combustion chamber and is driven in rotation with said chamber. It forms a vertical chimney, the base of which covers the upper end of the hollow shaft 9 and receives the combustion air emerging therefrom.

According to a preferred embodiment, the rotary core is composed of two co-axial tubes 6a and 6b defining together a first annular space 6c. The base of the outer tube 6b is flared so as to cover the upper end of the hollow shaft 9. The base of the inner tube 6a is secured to the hearth plate by gussets 6e. The top of the chimney is covered by a truncated cone-shaped deflector 6d which deviates the air downwards. Part of the pre-heated combustion air enters through the hollow shaft 9, traverses the annular space 6c and is injected obliquely downwards into the annular space defined by the materials flowing along the truncated cone-shaped deflector and coming to rest against the central core into a natural draining slope.

The flowing directions of the combustion air are given by arrows. It is shown that the combustion air is injected into the top of the combustion chamber, partly in the centre, and partly on the periphery, whilst being directed downwards, thus obtaining a very homogeneous high temperature combustion zone throughout the combustion chamber where the cracking of the tars and the gasification are effected. The axial tube 6a carries bars 10 in refractory metal forming de-clogging arms or studs which extend through the annular space 6c where they are cooled by the combustion air flow. Said arms 10 traverse the outer tube 6d and penetrate into the mass of the burning bed through which they are driven in rotation. De-clogging studs 10a are secured obliquely in the upper part and traverse the deflector 6d. The de-clogging strips 10/10a help the gravity-induced descent of the materials whilst preventing the formation of decks or arches.

The gas generator apparatus further comprises a first cylindrical casing 14 co-axially enclosing the combustion chamber 3 and defining with the outer shellplate 4a, a second annular space 14a. Said casing 14 also surrounds the lower part of the column 2. The lower end of the annular space 14a communicates with the peripheral opening 19 situated at the base of the combustion chamber and receives the gases coming out therefrom. The annular space 14a also communicates at its upper part with a discharge pipe 15 for the gases produced. Thus, the hot gases release heat at the lower part of the column 2 in the zone where the combustible material is pyrolyzed.

The cylindrical shell-plate 14 is greater in diameter than that covered by the end part of the vanes 7b and its lower end is welded on a base plate 21 above which move the vanes 7b.

The apparatus comprises an auxiliary ignition burner 16 which is a liquid or gaseous fuel burner whose nose is situated at the top of the combustion chamber. The apparatus further comprises a second cylindrical casing 17 co-axially enclosing the first 14, and defining therewith a third annular space 17a which is opened at its top end. It comprises at its lower end a discharge pipe 18. Said discharge pipe 18 is connected for example to the suction orifice of a blower 22 whose delivery is connected, on the one hand, to the pipe 5 and, on the other hand, to the end of the hollow shaft 9. The connections of the blower are shown in dotted lines on the drawing.

As a variant, if the gasogen operates by air suction, the pipe 18 is connected directly to the pipe 5 and to the hollow shaft 9 without going through a blower. It is clear then that the fresh combustion air is pre-heated a first time when it goes through the annular space 17a and it is used then to cool the external wall of the gasogen, recuperating heat in doing so.

The combustion air is thereafter heated by flowing partly through the coil 4 and partly through the chimney 6 which are in direct contact with the high temperature combustion zone, so that the air is injected into the upper part of the chamber at a high temperature, thus obtaining a very good combustion even from relatively poor combustibles, to reduce the rate of flow of the combustion air and finally to obtain at the outlet 15 a richer combustible gas.

In order to increase the speed of the air flow through the annular space 17a and thus to improve the heat exchanges, it is possible to channel the air through a helical path by placing in that space a spiral-wound flat or round bar 17b or several flat bars bent into half-circles and arranged horizontally to form deflectors.

FIG. 2 shows a partial vertical cross-section of a variant embodiment of the combustion chamber 3 of a gas generator according to the invention.

Said figure illustrates the lower part of the enclosure 2 and the side wall of the combustion chamber 4a which is lined on the inside with one or more coils 4. The wall 4a can optionally be covered on its inside face with a refractory or insulating layer 4b.

Neither the inside chimney 6, nor the rotary hearth plate 7, nor the walls situated outside the wall 4a have been shown in this drawing.

The gas generator according to FIG. 2 comprises an annular collector 5a of triangular cross-section, which is defined by the vertical wall of the enclosure 2, by a horizontal flange 23 shutting off the annular space situated where the lower edge of the enclosure 2 joins with the upper edge of the chamber 3, and by a metal plate 24 welded on the wall of the enclosure 2 and on the flange 23.

The collector 5a communicates via orifices 25 provided in the flange 23 with the annular volume 26 defined by the top whorl of the coil 4, the flange 23, the vertical wall of the enclosure 2 and the wall 4a. The upper ends of the coil or coils 4 issue into the volume 26.

The gas generator according to FIG. 2 is provided with nozzles 27 going through the collector 5a and issuing into the combustion chamber, on the periphery of its junction with the enclosure 2. Said nozzles are inclined downwardly and form with the vertical an angle α varying between 20° and an angle slightly less than 90°.

Said nozzles can be removed whilst the apparatus is functioning, if they need cleaning or replacement. Their length determines the penetration into the bed of material and is selected in relation to the functioning conditions.

FIG. 3 shows an exploded view of a nozzle 27. This is composed of two cylindrical and co-axial parts, one fixed 27a and one removable 27b.

The fixed part 27a comprises a tube portion 35 traversing the collector 5a and which is welded to the plate 24.

The front end of the fixed part 27a issues into an orifice 33 provided in the lower part of the wall 2. The rear end is situated outside the collector 5a and carries a flange 28 or any other equivalent means to secure the movable part. Said fixed part comprises lateral orifices 29 which communicate with the collector 5a and permit to feed pre-heated air to the movable part.

Said movable part 27b comprises a cylindrical sleeve 30 opened at both ends, which telescopically engages the fixed part and penetrates into the bed of material. Said sleeve is welded to rods 31 which are in turn welded to a flange 32 which latter is secured to the flange 28 by bolting or any other equivalent means.

The length of the rods 31 is selected in relation to the required penetration of the nozzle 30 into the bed.

Obviously, the rods 31 which connect the flange 32 to the sleeve 30 could be replaced by any other connection means letting the air through, such as for example a perforated sleeve.

The pre-heated combustion air coming out of the coils 4 goes through the orifice 25 and 29 and through the nozzles 30 according to the arrows.

When a sleeve 30 is worn, it is easily replaced and its replacement can be done whilst the apparatus is functioning.

FIG. 3 shows the angle α formed by the axis X X₁ of the nozzles with the vertical, which angle can vary between 20° and 89°.

FIG. 2 shows a pipe 34 through which passes an automatic or hand-operated ignition device for the gas generator which can include one or more of these devices.

What is claimed is:

1. Gas generator with fixed bed and reverse draught, to gasify solid combustible materials, comprising a cylindrical drying and pyrolysis enclosure of vertical axis, which is equipped at its upper end with a loading compartment, the lower end being opened and communicating with a co-axial combustion chamber the wall of which is composed of a shell-plate which is lined on the inside with one or more coils of which the lower ends are connected to one or more air-inlets and wherein the upper ends are connected to an annular collector situated on the junction between the said enclosure and the said combustion chamber, the annular collector comprising air outlets inclined downwardly and towards the axis.

2. The gas generator of claim 1 wherein the lower end of the said combustion chamber comprises an ash compartment for receiving the ashes from the combustion and a rotary hearth plate provided on its lower face with small stiffening blades pushing the ashes towards said ash compartment.

3. The gas generator of claim 2 in which the said rotary hearth plate is mounted on a hollow shaft which traverses it right through and the lower end of which is connected to a combustion air inlet, wherein the upper face of the rotary hearth plate is provided with an axial rotary core forming a vertical chimney which extends over the whole height of the combustion chamber, coaxially thereto, the said chimney communicating via its lower end with the upper end of the said hollow shaft and being covered at its upper end by a truncated cone-shaped deflector which deviates the combustion air downwards.

4. The gas generator of claim 3, wherein the said chimney is composed of two coaxial tubes defining together a first annular space inside which flows the combustion air.

5. The gas generator of claim 4, wherein the said inside tube of the axial chimney is provided with bars of refractory metal which extend through the said first annular space where they are cooled by the combustion air and which traverse the external tube to penetrate the combustion bed so as to improve the descent of the materials.

6. The gas generator of any one of the claims 2 to 5, comprising a first cylindrical casing which surrounds co-axially the combustion chamber defining therewith a second annular space comprising in its upper part, an outlet pipe for the combustible gases, wherein the lower end of the second annular space communicates with a peripheral opening situated between the lower edge of the combustion chamber and the said rotary hearth plate.

7. The gas generator of claim 6, comprising a second cylindrical outer casing which co-axially surrounds the first casing defining therewith a third annular space which is opened at the top and which is provided at the base with an outlet pipe connected, on the one hand, with the air inlets of the said coil and, on the other hand, with the lower end of the said hollow shaft and the third annular space forms part of a circuit for pre-heating the combustion air, which circuit can be equipped with a blower if necessary.

8. The gas generator of any one of claims 1 to 5, wherein the said loading compartment comprises a truncated cone-shaped enclosure of circular cross-section, the apex of which is situated downwardly and the inclination of whose generatrices with respect to the vertical can vary between zero and an angleα.

9. The gas generator of claim 1, wherein the said air outlets are constituted by nozzles which are inclined downwardly to form with the vertical axis of the gas generator an angle varying between 20° and 89°.

10. The gas generator of claim 9 wherein the said annular collector is of triangular cross-section defined by the vertical wall of the enclosure, a horizontal flange shutting off the upper end of the combustion chamber and an inclined plate, and the said flange comprises orifices which create a communication between the said collector and an annular volume defined by the top whorl of the coil or coils, by the said inclined plate, by the wall of the enclosure and by the said flange, the upper ends of the coil or coils issuing into the said volume.

11. The gas generator of claim 10, wherein the said nozzles are composed of two parts, one fixed part constituted by a portion of pipe provided with orifices and which traverses the said collector, the front end of which issues into an orifice situated in the lower part of the enclosure, the rear end being situated outside the collector and carrying a securing member, and a movable part which comprises a cylindrical sleeve opened at both ends which is joined by an air-permeable connection means to a securing member cooperating with the fist securing member so that said sleeve is telescopically engaged in the pipe portion and the length of the joining means determines the length of penetration of the nozzles into the bed of material.

* * * * *